United States Patent [19]

Goekler

[11] Patent Number: 5,017,909

[45] Date of Patent: May 21, 1991

[54] CAPACITIVE LIQUID LEVEL SENSOR

[75] Inventor: Lewis E. Goekler, Cincinnati, Ohio

[73] Assignee: Standex International Corporation, Cincinnati, Ohio

[21] Appl. No.: 294,200

[22] Filed: Jan. 6, 1989

[51] Int. Cl.⁵ .................. G08B 21/00; G01F 23/00; H01G 5/28

[52] U.S. Cl. .................. 340/620; 73/304 C; 361/284

[58] Field of Search ............ 340/620, 619, 618; 73/304 C; 324/61 R, 663, 672, 687; 361/284

[56] References Cited

U.S. PATENT DOCUMENTS

| | | | |
|---|---|---|---|
| 3,341,774 | 9/1967 | Dyben | 324/61 R |
| 3,553,575 | 11/1967 | Shea | 340/620 |
| 3,694,804 | 9/1972 | Hill | 340/59 |
| 3,805,230 | 4/1974 | Sakasegawa et al. | 340/59 |
| 4,099,167 | 7/1978 | Pomerantz et al. | 340/620 |
| 4,168,466 | 9/1979 | Boldt | 324/689 |
| 4,277,773 | 7/1981 | Blatnik | 340/59 |
| 4,316,183 | 2/1982 | Palmer et al. | 340/621 |
| 4,389,889 | 6/1983 | Larson | 340/620 |
| 4,603,581 | 8/1986 | Yamanoue et al. | 73/304 C |
| 4,638,291 | 1/1987 | Puscasu | 340/59 |
| 4,749,988 | 1/1988 | Berman et al. | 340/610 |
| 4,782,698 | 11/1988 | Wilson | 73/304 C |

FOREIGN PATENT DOCUMENTS 13504493 8/1986 Fed. Rep. of Germany .
696907 9/1950 Sweden .............................. 340/618

Primary Examiner—Reinhard J. Eisenzopf
Assistant Examiner—Kinfe-Michael Negash
Attorney, Agent, or Firm—Weingarten, Schurgin, Gagnebin & Hayes

[57] ABSTRACT

A non-intrusive fluid level detector including a single point capacitive sensor mounted on the outside surface of a receptacle such that capacitive principles can be utilized to sense the level of a liquid contained within the receptacle. The sensor assembly is disposed in a substantially fixed position on the exterior wall of the receptacle wherein the dielectric effect of the liquid changes the effective capacitance of the sensing capacitor as the liquid rises and falls within the receptacle. This change in effective capacitance is detected by electronic circuitry included in the detector device. In one embodiment, the fluid level detector is directly mounted to a completely non-conductive receptacle. In another embodiment, the fluid level detector is mounted to a non-conductive window which is an integral part of a receptacle fabricated out of a conductive material.

16 Claims, 4 Drawing Sheets

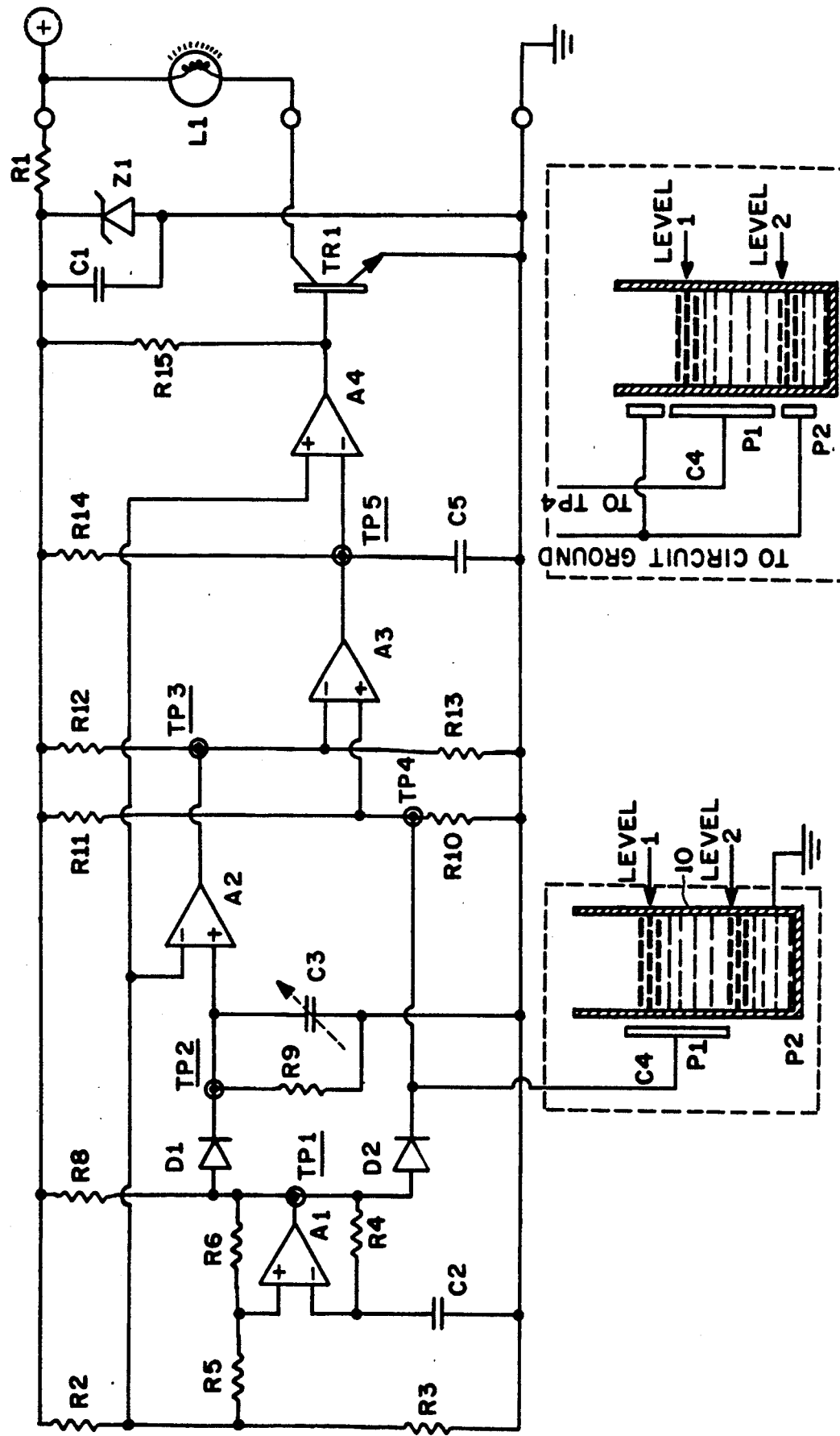

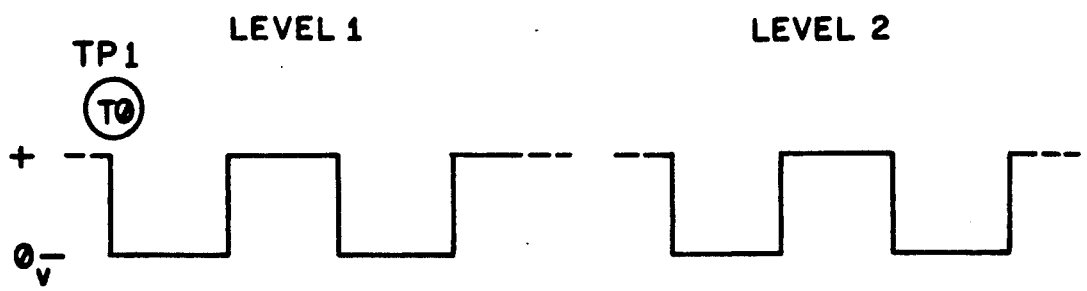
*FIG. 2A*
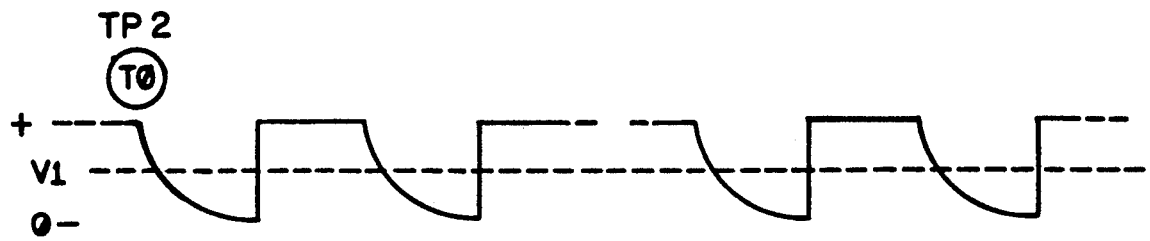
*FIG. 2B*
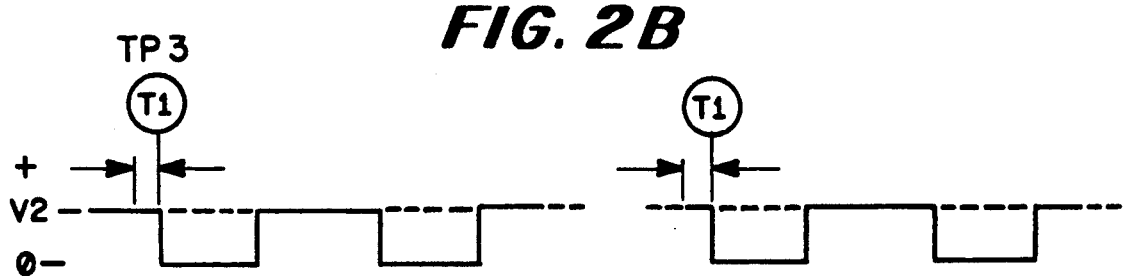
*FIG. 2C*
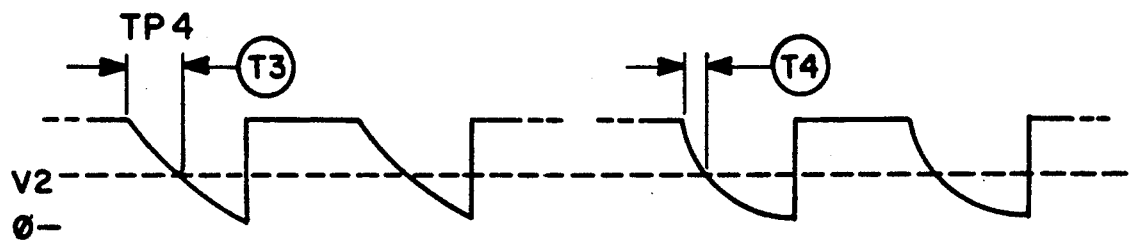
*FIG. 2D*
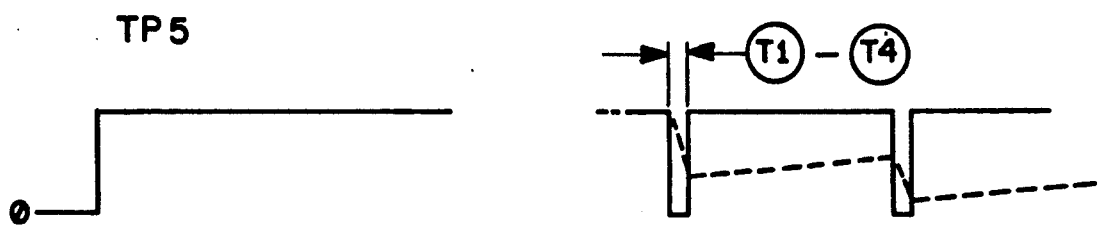
*FIG. 2E*
*FIG. 2*

CAPACITIVE LIQUID LEVEL SENSOR

FIELD OF THE INVENTION

The present invention relates to fluid level detectors and more particularly, to a non-intrusive fluid level detection system for detecting the level of a liquid contained within a receptacle.

BACKGROUND OF THE INVENTION

Fluid level detectors which sense the level of a liquid contained within a receptacle are well known for use in conjunction with automotive engines. Historically, such detectors have been made in the form of float operated switches involving moving parts which are subject to friction and wear. Other devices utilize an electrical probe to detect fluid levels by measuring the conductivity of the coolant. However, these devices require complicated current amplifying systems because there is often an insufficient amount of current passing through the electrodes to power an indicator lamp. In either of these systems, the measuring sensor is located in the fluid where contaminants are likely to collect on the sensor and disturb the fluid level measurement. Furthermore, the devices in the prior art, as described, are categorized as "intrusive" in that they require an opening into the receptacle containing the fluid. This creates an additional potential for fluid leaks as well as potential deterioration of the sensing devices.

Due to the problems discussed above, it has become desirable to employ non-intrusive means to sense fluid levels contained in receptacles. These non-intrusive systems typically involve wave propagation techniques which are implemented through a transmitter/receiver system. Typically, these systems involve the transmission of an ultrasonic signal from a transmitting transducer through a fluid to a receiving transducer. Such ultrasonic transmission systems require a liquid transmission medium in order to carry the ultrasonic signal from the transmitting transducer to the receiving transducer. Lack of signal at the receiving transducer relates to a lack of liquid transmission medium, activating a no fluid present indication. However, a failure in the transducer pair or in their respective electronic connections results in a lack of signal from the receiving transducer which, in turn, activates the normal failure mode thereby falsely indicating a dry or no fluid present state.

The increasing importance of monitoring fluid levels in automotive and other applications is creating a need for more reliable non-intrusive fluid level sensors. It is, therefore, important that a fluid level detection system be developed which can provide reliable data and which does not require contact with the fluid being measured.

SUMMARY OF THE INVENTION

In accordance with the present invention a non-intrusive fluid level detector is provided for mounting on the exterior wall of a receptacle. The present invention provides single point sensing of predetermined low levels of fluids, as in an automobile cooling system or a windshield washer solvent reservoir, without contact with the liquid being sensed. The invention also provides an electrical signal which can energize an alarm light or other indicator. The fluid level detector of the present invention incorporates capacitive sensor means established relative to a fluid receptacle in a substantially fixed relation on the outside wall of the receptacle. The capacitive sensor can be made to be an integral part of a printed circuit containing electronic detection circuitry, thereby making the device self-contained. This sensor assembly is mounted on the exterior wall of the fluid receptacle at a position to sense the lower limit of acceptable fluid level.

The present invention utilizes capacitive principles to sense the level of a liquid contained within a non-metallic receptacle. As a liquid rises and falls in the container, the dielectric effect of the liquid changes the effective capacitance of the sensing capacitor which is detected by electronic circuitry coupled to the sensor. The device remains activated whenever power is applied and provides an indication to the user only when the low liquid level is detected.

The present invention is a passive device in that the device monitors the level of the liquid within the receptacle at all times and requires no interaction or other monitoring by the user.

DESCRIPTION OF THE DRAWINGS

The invention will be more fully understood from the following detailed description taken in conjunction with the accompanying drawings, in which:

FIG. 1A is a schematic of the circuitry of the present invention;

FIG. 1B is a schematic of an alternative capacitive sensing circuit;

FIGS. 2A-2E are signal diagrams of signals at certain test points in the schematic diagram of FIG. 1;

DETAILED DESCRIPTION OF THE INVENTION

Figure 3A:
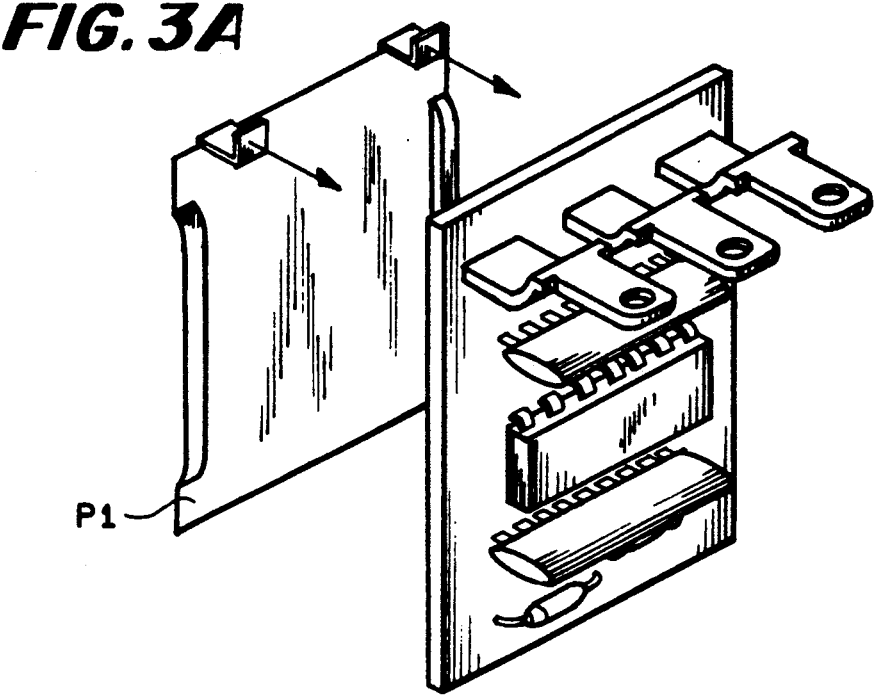
FIGS. 3A and 3B are exploded perspective views of a preferred embodiment of the liquid level sensor of the present invention.

FIG. 1A illustrates the circuit diagram of one embodiment of the fluid level detector of the present invention. The supply voltage for this circuit is typically provided by a 12-volt automobile battery which is reduced to a 5-volt DC source voltage by means of a voltage regulator comprising the combination of resistor R1 and zener diode Z1. Capacitor C1 serves as a filter for this voltage supply regulator.

The detector of FIG. 1A incorporates an amplifier A1 in conjunction with a resistor/capacitor network R4 and C2 and resistors R5 and R6 to form a square wave oscillator. A reference voltage is supplied from the voltage regulator where the reference voltage value is determined by the voltage divider circuit R2/R3. This voltage serves as a reference voltage for the square wave oscillator and voltage comparators A2, A4 located in the circuit, as will be described.

The output of the square-wave oscillator described above, is shown as the square wave of FIG. 2A. The oscillator produces an alternating electrical output which causes capacitors C3 and C4 to charge through diodes D1 and D2, respectively, where capacitor C4 is a sensor capacitor and capacitor C3 is a reference capacitor. As stated, capacitor C4 is the sensor capacitor wherein the two conductive surfaces of the capacitor are plate P1 and the residual ground of the receptacle 10 through its mounting arrangement. The dielectric of the capacitor is the fluid in the receptacle 10 such that the capacitance value of C4 varies relative to the fluid level in the receptacle. The capacitance value of capacitor C3 is adjustable to match the value of capacitor C4 when a predetermined liquid level is sensed, i.e., at the critical level.

FIG. 1B shows an alternative embodiment of the present invention wherein plates P2 and P3 are added to the configuration of sensing capacitor C4. The plates P2 and P3 are connected to circuit ground. A lower level capacitance is provided by plates P1 and P2, and an upper level capacitance is provided by plates P1 and P3.

When the voltage from the oscillator circuit at test point 1 (TP1) makes a transition from positive to negative, capacitors C3 and C4 begin to discharge through resistors R9 and R10, respectively. It is the difference in voltage decay across resistors R9 and R10 due to the capacitance values of capacitors C3 and C4 which enables the circuit to determine if there is sufficient fluid in the receptacle 10.

Referring again to FIG. 1A, voltage comparator A2 compares the voltage at test point 2 (TP2) with the reference voltage set by resistors R2 and R3. FIGS. 2B and 2C illustrate that when the voltage at TP2 decreases below the reference voltage V1, due to the discharge of capacitor C3, the output of the comparator A2 reference voltage at TP3 drops to zero. The time between the point where capacitor C3 begins to discharge and the output of the comparator A2 drops to zero is used as a reference time T1. Similarly, the comparator A3 compares the square wave output of the comparator A2 with the voltage decay signal across resistor R10 due to sensor capacitor C4 at test point TP4.

As shown in FIGS. 2C-2E, if the discharge time T3 of capacitor C4 is longer than the reference time T1 established by the comparator A2, the output of the comparator A3 remains high. Conversely, if discharge time T3 is shorter than reference time T1, due to a faster discharge rate in C4, the output of the comparator A3 pulses low for a period of time in which the discharge voltage at TP4 is less than the output voltage of the comparator A2 (TP3). In application, this pulse is actually a current pulse rather than a voltage pulse.

The output of the comparator A3 is an open collector type output which allows capacitor C5 to charge through resistor R14. If the output of A3 pulses low, capacitor C5 discharges to ground and the voltage at test point 5 (TP5) goes to zero.

Finally, the reference voltage set by resistors R2 and R3 is compared to the voltage at TP5 through the comparator A4. If the voltage at TP5 is high, representing capacitance C4 to be of a relatively large value and corresponding to a sufficient fluid in the reservoir, the output of A4 will pull to ground and transistor TR1 will not conduct. However, if the voltage at TP5 is low, which means that capacitance C4 is not of a sufficient value, the output of A4 will bias transistor TR1 such that current will flow through the collector and energize lamp L1.

In operation, when the fluid level in the receptacle is full, capacitor C4 takes a certain length of time to discharge; when the fluid is at a lower level, capacitor C4 takes a shorter period to discharge. Thus, as the fluid level in the receptacle decreases, the capacitance of capacitor C4 also decreases, which, in turn, decreases the discharge time of capacitor C4. This causes a current pulse to be output by comparator A3 during the period in which the discharge voltage from capacitor C4 is less than the voltage output from comparator A2.

The current pulse causes capacitor C5 to discharge, thereby allowing the output of comparator A4 to rise and allowing current to flow through transistor TR1 to lamp L1. When current flows through lamp L1, the indicator lamp is lit.

Figure 3B:
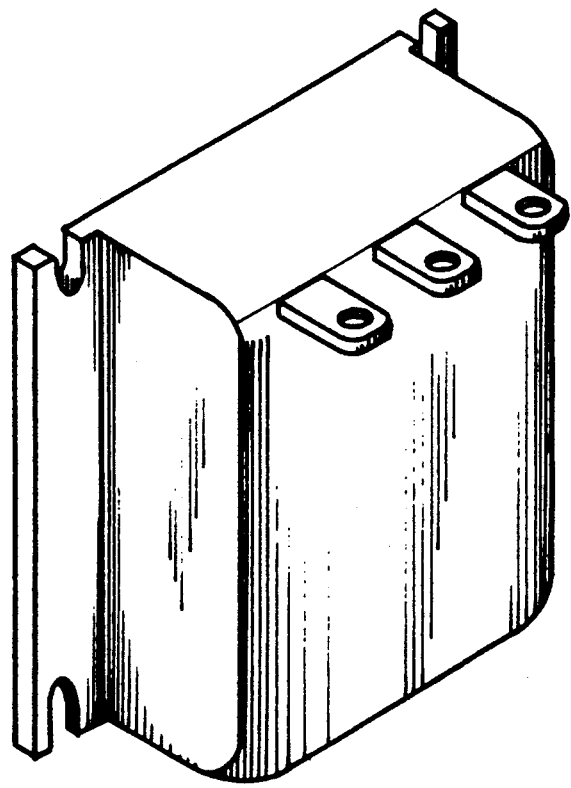

An exploded perspective view of the present invention is shown in FIGS. 3A and 3B where sensor plate P1 is shown as an integral part of the assembled unit. In an alternative embodiment, capacitor plate P1 can be physically separated from the electronic circuitry of the invention such that the sensor plate P1 is attached to the fluid receptacle and is electronically coupled to the corresponding electronic circuitry located at a position which is isolated from the receptacle.

Figure 4A:
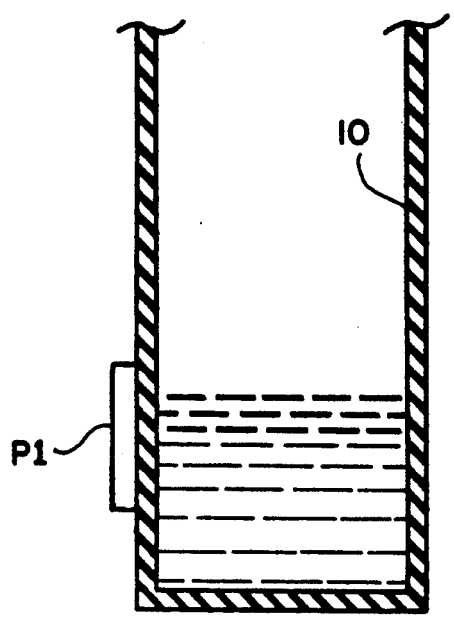
FIGS. 4A and 4B are two-dimensional views of alternative mounting configurations of the present invention.
Figure 4B:
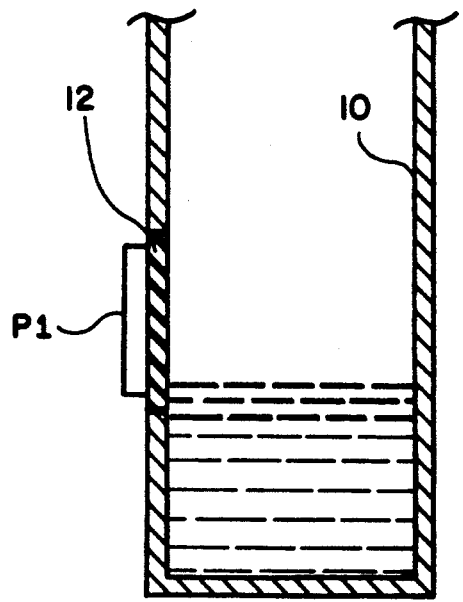

In accordance with the present invention, as shown in FIGS. 4A and 4B, the sensing capacitor can be mounted to the receptacle 10 in various ways depending on whether the receptacle 10 is made of a conductive or a non-conductive material. In one embodiment of the invention, shown in FIG. 4A, the fluid receptacle 10 is completely made of a non-conductive material and the sensing capacitor plate P1 is mounted directly to the surface of the receptacle 10. In another embodiment of the invention, shown in FIG. 4B, the receptacle 10 is made of a conductive material except for a relatively small window 12 of non-conductive material making up a portion of a wall of the receptacle 10 upon which the capacitive plate P1 is mounted.

The fluid level detector of the present invention permits the monitoring of a level of a fluid contained in a receptacle wherein there is no engagement between the sensing device and the liquid. The disclosed invention is not to be limited by what has been particularly shown and described except as indicated by the present claims.

What is claimed is:

1. A non-intrusive fluid level detector for detecting a predetermined level of a liquid contained within an electrically conductive receptacle, comprising:
    a single capacitance plate mounted on said receptacle and electrically insulated from said receptacle, said capacitance plate being cooperative with said receptacle and the liquid in the receptacle to produce a sensor capacitor having a capacitance which varies in magnitude in accordance with the level of liquid contained within the receptacle;
    detection circuitry coupled to said capacitance plate and responsive to a difference between a voltage decay signal derived from said sensor capacitor and a reference voltage decay signal derived from a reference capacitor to provide an output signal when a predetermined voltage difference is detected therebetween; and
    indicating means coupled to said detection circuitry and responsive to said predetermined voltage difference as detected by said detection circuitry to provide an indication of predetermined level of liquid contained within the receptacle.

2. The fluid level detector of claim 1, wherein said detection circuitry and said capacitance plate are separate, physically independent units which are coupled electronically.

3. The fluid level detector of claim 1 wherein said capacitance plate is made of a copper plate.

4. The fluid level detector of claim 1 wherein said capacitance plate includes mounting means for mounting said plate to an exterior wall of the receptacle.

5. The fluid level detector of claim 1 wherein the detection circuitry and capacitance plate are mounted on a circuit board, the circuit board including mounting means for mounting said circuit board on a wall of the receptacle.

6. The fluid level detector of claim 5 including a housing means comprising a unitary structure, wherein said detection circuitry and said capacitance plate are embodied within said housing means.

7. The fluid level detector of claim 6, wherein the housing means includes mounting means for securing the housing means to an exterior wall of the receptacle.

8. The fluid level detector of claim 1, wherein said predetermined voltage difference corresponds to the absence of liquid in said receptacle.

9. The fluid level detector of claim 1, wherein said indicating means includes an alarm lamp which is energized when said predetermined voltage difference is detected.

10. The fluid level detector of claim 1 wherein said detection circuitry includes:
- first circuit means for receiving an oscillating voltage signal and providing a voltage decay signal, decaying over time in response to a negative transition in the oscillating voltage signal;
- second circuit means for providing the reference voltage signal; and
- third circuit means for comparing the voltage decay signal and the reference voltage and providing said output signal when a predetermined voltage difference is detected.

11. The fluid level detector of claim 1, wherein said detection circuitry includes:
- a voltage regulator circuit for providing direct current source and reference voltage signals;
- said square wave oscillator circuit for providing a square wave oscillating signal to a reference capacitor and to said sensor capacitor from the direct current source voltage signal;
- a reference capacitance circuit for providing a first voltage decay signal, decaying over time in response to a negative transition in the square wave oscillating signal, as derived from the reference capacitor;
- a first voltage comparator circuit for comparing the output signal of the reference capacitance circuit to the direct current reference voltage signal and providing a first voltage comparator output signal;
- a sensor capacitance circuit for providing a second voltage decay signal, decaying over time in response to a negative transition in said square wave oscillating signal, as derived from said second capacitor;
- a second voltage comparator circuit for comparing the output of the sensor capacitance circuit to the output of the first voltage comparator circuit and providing a second voltage comparator output signal; and
- a third voltage comparator circuit for comparing the output of the second voltage comparator circuit to the direct current reference voltage signal and providing a third voltage comparator output signal to an indicator circuit for providing an indication of when a predetermined voltage difference is detected.

12. A non-intrusive fluid level detector for detecting a predetermined level of liquid in a container, comprising:
- container means for containing the liquid, said container means fabricated from an electrically insulating material;
- at least two conductive plates situated in the same plane and mounted to said container means, said at least two conductive plates being cooperative with liquid in the container means to produce a sensor capacitor having a capacitance which varies in magnitude in accordance with the level of liquid contained within the container means;
- detection circuitry coupled to said sensor capacitor and responsive to a difference between a voltage decay signal derived from said sensor capacitor and a reference voltage decay signal derived from a reference capacitor to provide an output signal when a predetermined voltage difference is detected therebetween; and
- indicating means coupled to said detection circuitry and responsive to said output signal to provide an indication of predetermined level of liquid contained within the container means.

13. A non-intrusive fluid level detector for detecting a predetermined level of liquid in a container comprising:
- container means for containing the liquid, said container means fabricated from a metallic, electrically conductive material, said container means including a window of non-conductive material as an integral portion of a wall of said container means;
- a single capacitance plate for mounting to said window of non-conductive material, said capacitance plate being cooperative with said electrically conductive receptacle and the liquid in the container means to produce a sensor capacitor having a capacitance which varies in magnitude in accordance with the level of liquid contained within the container means;
- detection circuitry coupled to said sensor capacitor and responsive to a difference between a voltage signal derived from said sensor capacitor and a reference voltage to provide an output signal when a predetermined voltage difference is detected; and
- indicating means coupled to said detection circuitry wherein said indicating means is responsive to said output signal to provide an indication of a predetermined level of liquid contained within the container means.

14. A non-intrusive capacitive liquid level sensor for detecting a predetermined level of liquid in a container, comprising:
- non-conductive container means for storing liquid;
- at least two conductive plates situated in the same plane wherein said at least two conductive plates are cooperative with the liquid in the container means to provide a sensor capacitor having a capacitance which varies in magnitude with respect to the amount of liquid present between said at least two conductive plates;
- detection circuit means coupled to said sensor capacitor, said detection circuit means including:
  - an oscillator circuit coupled to said sensor capacitor for providing an oscillating voltage signal to said sensor capacitor, said sensor capacitor providing a sensor voltage decay signal as the voltage across said sensor capacitor decays over time in response to a negative transition in the oscillating voltage signal;

a reference capacitor circuit coupled to said oscillator circuit for receiving said oscillating voltage signal and providing a reference voltage decay signal, as the voltage across said reference capacitor decays over time in response to a negative transition in the oscillating voltage signal;

a voltage comparator circuit coupled to said sensor capacitor and to said reference capacitor circuit for receiving and comparing said reference voltage decay signal and said sensor voltage decay signal and providing an output signal when a predetermined voltage difference is detected therebetween; and indicating means coupled to said detection circuit means, responsive to said output signal to provide an indication of the presence or absence of a predetermined level of liquid in the container means.

15. A non-intrusive capacitive liquid level sensor for detecting a predetermined level of liquid in a container, comprising:

electrically conductive container means for storing liquid, said container means including, as an integral portion of a wall of said container means, a window of non-conductive material;

a single capacitance plate for mounting to said window of non-conductive material, wherein said single capacitance plate is cooperative with said electrically conductive container means and the liquid therein to provide a sensor capacitor having a capacitance which varies in magnitude with respect to the amount of liquid present in said container means;

detection circuit means coupled to said sensor capacitor, said detection circuit means including:

an oscillator circuit coupled to said sensor capacitor for providing an oscillating voltage signal to said sensor capacitor, said sensor capacitor providing a sensor voltage decay signal as the voltage across said sensor capacitor decays over time in response to a negative transition in the oscillating voltage signal;

a reference capacitor circuit coupled to said oscillator circuit for receiving said oscillating voltage signal and providing a reference voltage decay signal, as the voltage across said reference capacitor decays over time in response to a negative transition in the oscillating voltage signal;

a voltage comparator circuit coupled to said sensor capacitor and to said reference capacitor circuit for receiving and comparing said reference voltage decay signal and said sensor voltage decay signal and providing an output signal when a predetermined voltage difference is detected therebetween; and indicating means coupled to said detection circuit means and responsive to said output signal to provide an indication of the presence or absence of a predetermined level of liquid in the container means.

16. A non-intrusive liquid level sensor for detecting a predetermined level of liquid contained within a receptacle, comprising:

a single capacitance plate mounted to said receptacle, said capacitance plate being cooperative with the liquid in the receptacle and the residual ground of the receptacle to produce a sensor capacitor having a capacitance which varies in magnitude in accordance with the level of liquid contained within the receptacle;

detection circuitry coupled to said capacitance plate and responsive to a difference between a voltage signal derived from said sensor capacitor and a reference voltage signal to provide an output signal when a predetermined voltage difference is detected; and indicating means coupled to said detection circuitry and responsive to said predetermined voltage difference as detected by said detection circuitry to provide an indication of a predetermined level of liquid contained within the receptacle.

* * * * *

UNITED STATES PATENT AND TRADEMARK OFFICE
CERTIFICATE OF CORRECTION

PATENT NO. : 5,017,909

DATED : May 21, 1991

INVENTOR(S) : Lewis E. Goekler

It is certified that error appears in the above-identified patent and that said Letters Patent is hereby corrected as shown below:

Column 5, line 35, "said square wave oscillator" should read --a square wave oscillator--.

Column 5, line 36, "oscillating signal to a reference" should read --oscillating signal to said reference--.

Column 5, line 51, "as derived from said second capacitor;" should read --as derived from said sensor capacitor;--.

Signed and Sealed this

Sixth Day of April, 1993

Attest:

STEPHEN G. KUNIN

*Attesting Officer*     Acting Commissioner of Patents and Trademarks